US010981234B2

(12) United States Patent
Del Rossa (10) Patent No.: US 10,981,234 B2
(45) Date of Patent: Apr. 20, 2021

(54) APPLICATION-ADAPTABLE ENGINE REPAIR TEMPLATE (71) Applicant: Jeffrey Del Rossa, Pittsburgh, PA (US)

(72) Inventor: Jeffrey Del Rossa, Pittsburgh, PA (US)

( * ) Notice: Subject to any disclaimer, the term of this patent is extended or adjusted under 35 U.S.C. 154(b) by 147 days.

(21) Appl. No.: 16/294,287

(22) Filed: Mar. 6, 2019

(65) Prior Publication Data
US 2020/0284183 A1 Sep. 10, 2020

(51) Int. Cl.
*B23B 47/28* (2006.01)
*B23B 49/02* (2006.01)
*F01N 13/18* (2010.01)

(52) U.S. Cl.
CPC ............ *B23B 47/28* (2013.01); *B23B 49/023* (2013.01); *F01N 13/1805* (2013.01); *F01N 2450/24* (2013.01); *F01N 2450/40* (2013.01); *Y10T 408/97* (2015.01)

(58) Field of Classification Search
CPC ......... B23B 47/28; B23B 49/023; B23G 1/48; Y10T 408/97
See application file for complete search history.

(56) References Cited

U.S. PATENT DOCUMENTS

| | | | | |
|---|---|---|---|---|
| 2,367,582 A * | 1/1945 | Honyoust | ............... | B23B 47/28 408/76 |
| 2,619,730 A * | 12/1952 | Carter | ..................... | B25H 7/00 33/666 |
| 2,710,454 A * | 6/1955 | Kershaw | .................. | G01B 5/00 33/669 |
| 3,768,918 A * | 10/1973 | Bethke | .................. | B23B 49/023 408/72 B |
| 4,030,854 A * | 6/1977 | Grannis | .................. | B23B 47/28 408/115 B |
| 4,449,867 A * | 5/1984 | Dergo | ..................... | B23B 47/28 408/103 |
| 4,593,450 A * | 6/1986 | Dumire | ................ | B23Q 16/001 29/559 |
| 5,154,548 A * | 10/1992 | Walsh | ................... | B23B 47/288 408/115 R |
| 5,174,693 A * | 12/1992 | Lee | ........................ | B23B 47/287 408/108 |
| 5,308,199 A * | 5/1994 | Juang | ..................... | B23B 47/287 408/103 |
| 5,813,803 A * | 9/1998 | Sommerfeld | ........... | B23B 47/28 408/103 |
| 7,214,008 B1 * | 5/2007 | Dods | ..................... | B23B 47/287 408/115 R |
| 7,481,607 B2 * | 1/2009 | Rusiana | ................ | B23B 47/287 408/115 R |
| D690,180 S | 9/2013 | Del Rossa | | |

(Continued)

FOREIGN PATENT DOCUMENTS

DE 2031156 A1 * 12/1971 .......... B23B 47/288
JP 2007276017 A * 10/2007

*Primary Examiner* — Eric A. Gates
(74) *Attorney, Agent, or Firm* — Buchanan Ingersoll & Rooney PC (57) ABSTRACT

An improved apparatus for repairing broken mounting holes in engines, such as broken exhaust manifold mounting holes, is disclosed. The adjustable template can be readily mounted to different components on different types of engines and provides adjustable carriages that allow for the precise alignment of bushing and various repair tools to facilitate repair of broken mounting holes.

10 Claims, 7 Drawing Sheets

(56) References Cited

U.S. PATENT DOCUMENTS

| | | | |
|---|---|---|---|
| D694,084 S | 11/2013 | Del Rossa | |
| 8,641,333 B2* | 2/2014 | Blick | B23B 47/288 |
| | | | 408/115 R |
| 9,782,838 B2* | 10/2017 | Pedersen | B23B 49/026 |
| 10,589,363 B2* | 3/2020 | Beydler | B23B 47/284 |

* cited by examiner

APPLICATION-ADAPTABLE ENGINE REPAIR TEMPLATE

FIELD OF THE INVENTION

The present invention generally relates to an apparatus for repairing mounting bolt holes for components in an engine, such as exhaust manifold mounting holes.

BACKGROUND OF THE INVENTION

Exhaust manifolds in automotive, truck, and over-the-road tractor engines collect the exhaust from the multiple cylinder exhaust ports in an engine into a single exhaust pipe. They are generally mounted to the engine via threaded bolts that fit into threaded mounting holes in the engine. This allows the exhaust manifold to be removed in order to give access to the cylinder exhaust ports for repair, replacement, cleaning, or diagnostic reasons.

The exhaust manifolds are exposed to extreme and hostile environmental conditions, such as temperature extremes and fluctuations, water, engine fluids, and other caustic or corrosive liquids, that can cause the manifold casting to deform and bolts and threaded holes to degrade over time. This degradation can cause the bolts to seize in the threaded holes, and manifold deformation can cause the bolts to break off inside of the cylinder head, both of which can hinder the ability to service or repair the engine.

Traditional ways of repairing exhaust manifold bolt holes all have problems or limitations. One traditional method involves using a template that is customized for a particular engine and exhaust manifold configuration. This approach requires mechanics to have a different template for every engine/exhaust manifold configuration, which is expensive, requires additional storage for the templates when not in use, and provides no flexibility for a mechanic to service an uncommon engine or one for which he or she does not have the appropriate template.

Another approach utilizes a more flexible template with a fixed hole on one end of the template where repair tools are inserted and adjustable guides on the other end. In this approach, the mechanic or user has to physically measure the distance between multiple bolt holes and then manually adjust the position of the adjustable guides based on the measured distance between the bolt holes in order to mount the template on the engine. This method lacks the necessary precision because it depends on how accurately the mechanic measures the distances between the bolt holes and how accurately he or she then adjusts the template based on those measured distances. If the measurements or adjustments are even slightly off, the repair hole will not be precisely aligned with the broken bolt hole in the cylinder head, which can further damage the bolt hole and cause delays in the repair process. In addition, because of position of the fixed repair hole on one end of the template, a single template of this kind is not sufficient to reach every bolt hole and every configuration on the engine (e.g., because of the size of the engine or other engine components interfering with the positioning of the template), which necessitates having multiple templates to be able to repair every possible broken bolt hole. Moreover, linkages that might expand the reach of the template for additional holes to repair introduce additional/accumulative tolerance error.

Thus, there is the need to repair these broken or blocked exhaust manifold threaded bolt holes (and other mounting bolt holes in an engine) in a simple and cost-effective manner. In particular, there is a need for a single repair device that can easily be adapted with precision to different engines (and different exhaust manifold and other connections) to facilitate repairs. Such a device should be able to be easily and accurately mounted onto the engine and provide adjustable guides to precisely align the various tools (such as drill bits and taps) needed to repair any of the broken or blocked threaded holes in the engine. By providing a precision guide that is adaptable and made for various engine applications the device could be used on different engines, even though the engines may have different numbers of threaded holes, different sizes of threaded holes, and different placements of threaded holes. The apparatus claimed in this application meets these needs.

SUMMARY OF THE INVENTION

Embodiments of the disclosed invention allow for operators to repair any broken mounting holes, such as exhaust manifold mounting holes, in a variety of different engines with different configurations using a single apparatus. The invention avoids the need to purchase separate engine-specific tools to repair the different threaded mounting holes or to use general purpose tools that are cumbersome and inefficient. The embodiments provide a mechanism for precisely creating an on-the-vehicle template by aligning and adjusting guide carriages, containing bushings through which repair tools (such as drill bits and taps, among others) can be inserted. This facilitates the technician's ability to develop a precision tool to drill out broken or stuck bolts in the mounting holes and then re-tap the holes to repair them.

A method for using the repair apparatus is also disclosed.

An apparatus for repairing engine mounting holes, comprising: a plate with a top side and a bottom side; an extended channel in the plate that extends through the plate from the top side to the bottom side and is substantially the length of the plate; and at least three carriages, said first, second, and third carriages being each comprised of a carriage flange and a carriage nut; wherein each carriage flange has a bottom base and a threaded portion extending from the bottom base; each carriage flange has a hollow portion that extends through the center of both the bottom base and the threaded portion and that forms an inside and an outside region of the threaded portion; the threaded portion is threaded on both the inside and outside regions of the threaded portion; each carriage nut has an interior threaded nut portion, wherein the interior threaded nut portion is configured to thread onto the outside region of the threaded portion; and each carriage is configured to fit inside the channel; and three alignment pieces, said first, second, and third alignment pieces being each configured to thread into the inside threaded region of the threaded portion of each carriage flange.

A method for repairing an engine mounting hole, comprising: aligning the repair device described above to an engine by adjusting the position of the first carriage in the channel to align with a first exposed mounting hole in the engine by using the first alignment piece inserted into the inside threaded region of the threaded portion of the first carriage flange; adjusting the position of the second carriage in the channel to align with a second exposed mounting hole in the engine by using the second alignment piece inserted into the inside threaded region of the threaded portion of the second carriage flange; adjusting the position of the third carriage in the channel to align with a third exposed mounting hole in the engine by using the third alignment piece inserted into the inside threaded region of the threaded portion of the third carriage flange; and fixing the first, second, and third carriages into their respective positions; repositioning the apparatus over the engine such that the third carriage aligns with a broken mounting hole in the engine and the first and second carriages align with a fourth and a fifth exposed mounting hole in the engine; securing the apparatus to the engine by inserting mounting pieces through the first and second carriages; inserting a bushing into the third carriage; and inserting a repair tool into the bushing.

DESCRIPTION OF THE INVENTION

Figure 1:
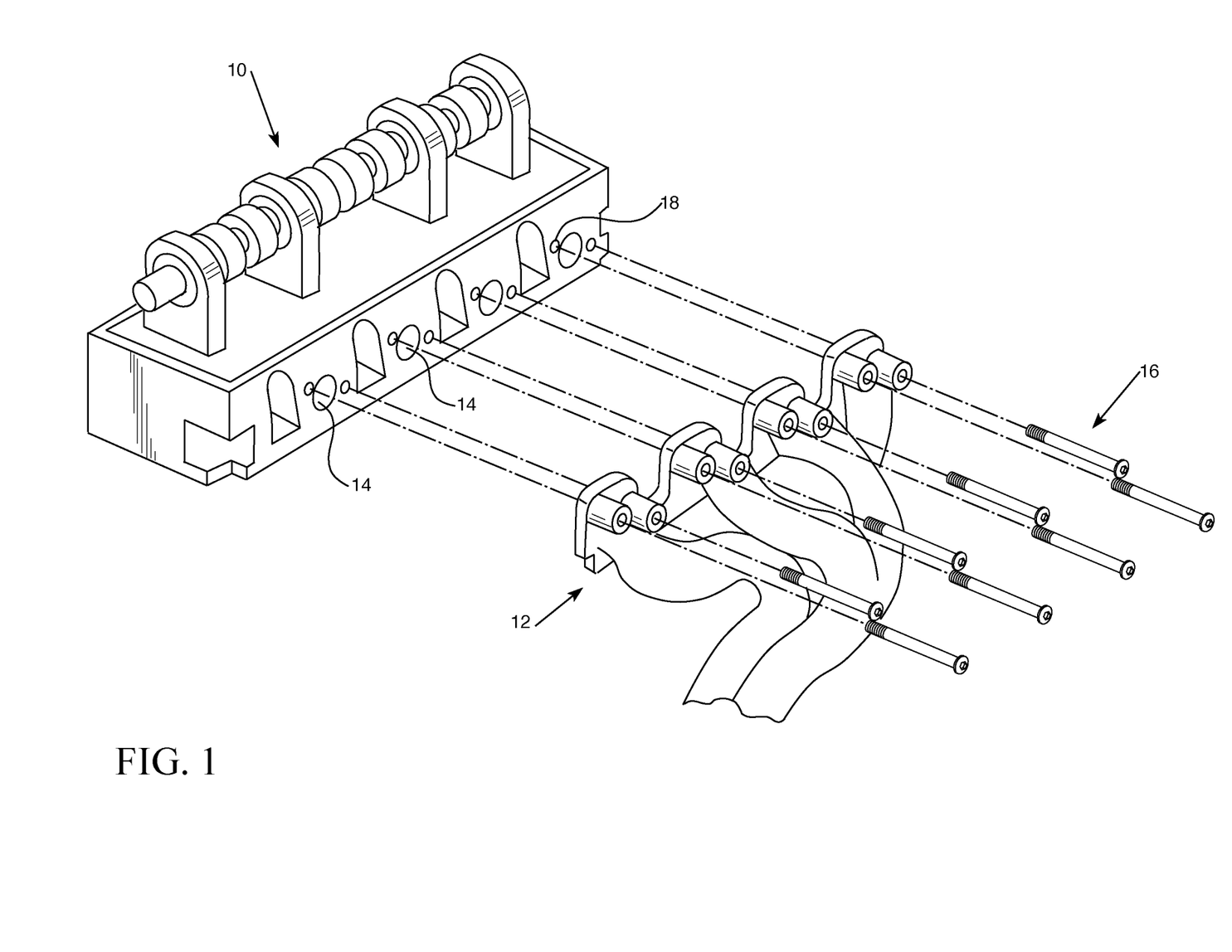
FIG. 1 is an exploded view of an engine with an exhaust manifold.

An exploded view of an exemplary engine assembly 10 is shown in FIG. 1. An exhaust manifold 12 covers cylinder head exhaust ports 14 on engine 10. Exhaust manifold 12 is attached to engine 10 via mounting bolts 16, which screw into threaded mounting holes 18 in engine 10. As one skilled in the art would recognize, engine 10, exhaust manifold 12, and exhaust ports 14 can be in different shapes, forms, and locations. Similarly, the number, position, and type of mounting bolts 16 and threaded mounting holes 18 can also vary for different engines. However, the general principles described below still apply even though the engines and components may be different.

Figures 2, 3:
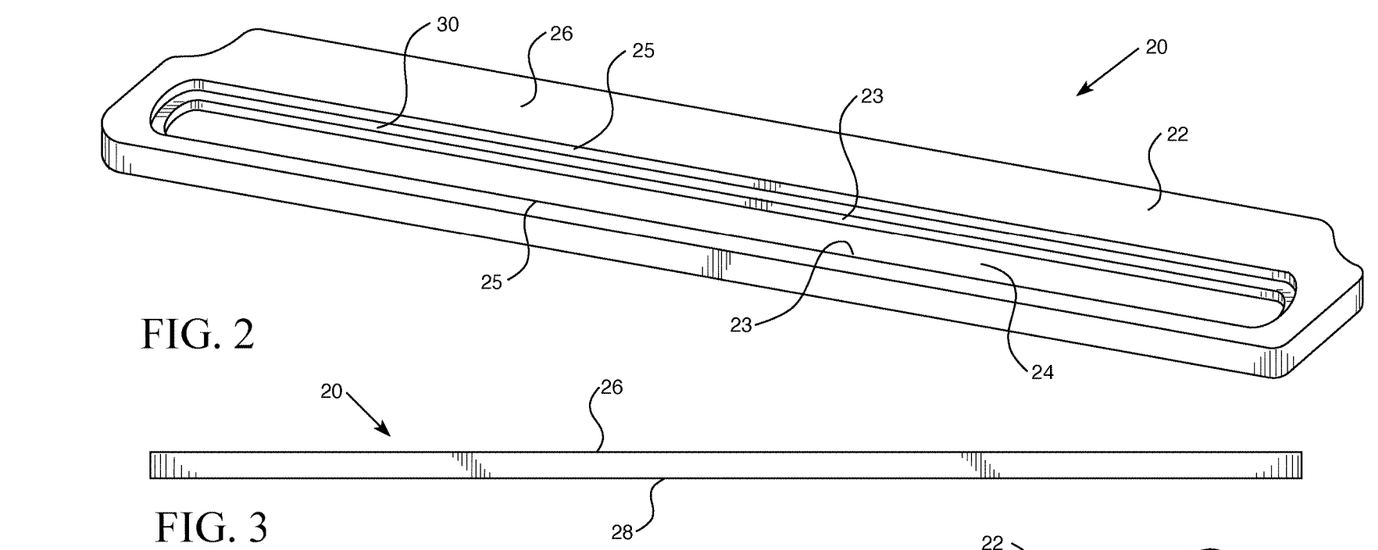
FIG. 2 is a perspective view of the top side of a plate.
FIG. 3 is a side view of a plate.
Figure 4:
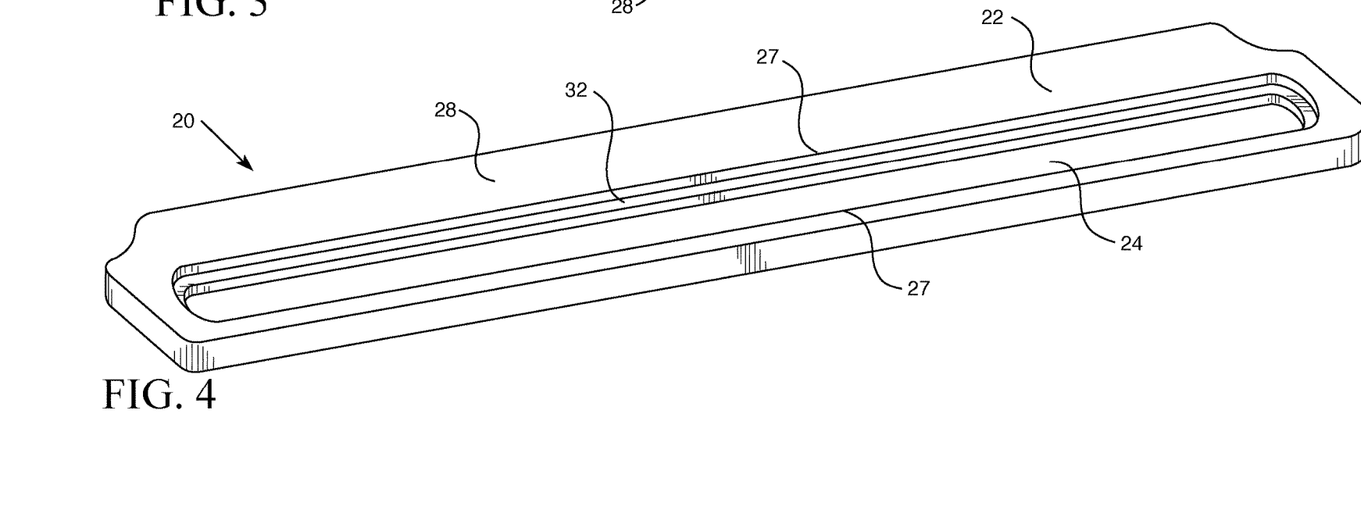
FIG. 4 is a perspective view of the bottom side of a plate.
Figure 5:
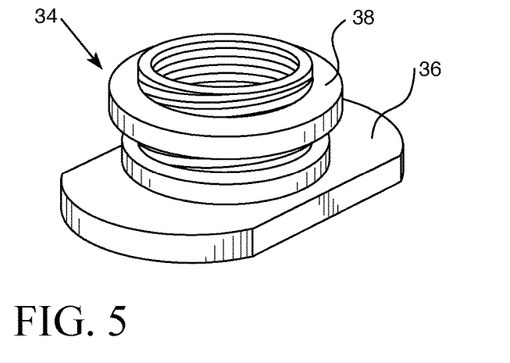
FIG. 5 is a perspective view of an assembled carriage.
Figure 6:
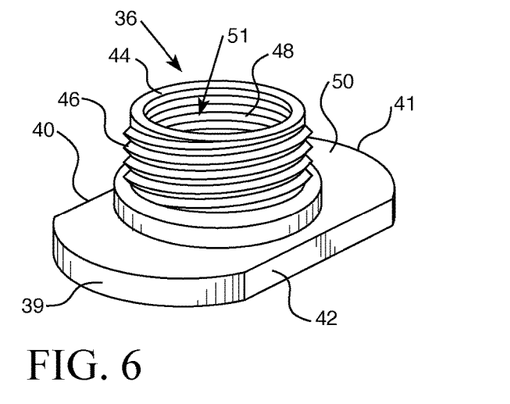
FIG. 6 is a perspective view of a carriage flange.
Figure 7:
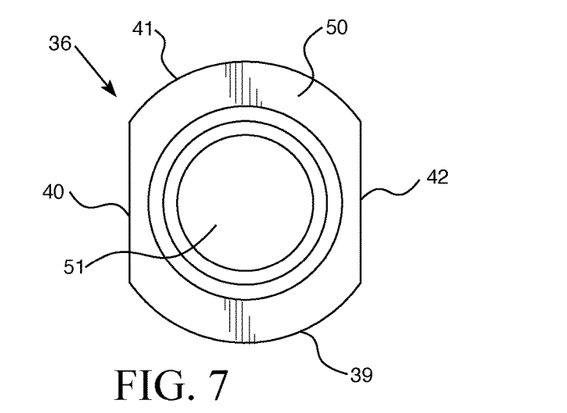
FIG. 7 is top view of a carriage flange.
Figure 8:
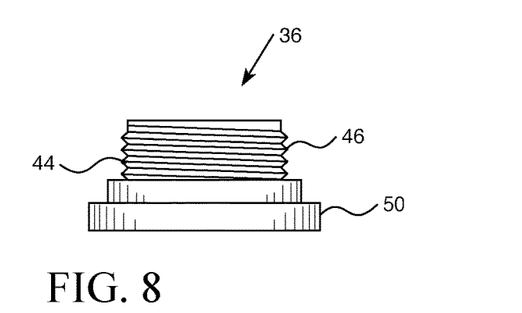
FIG. 8 is a side view of a carriage flange.

In one exemplary embodiment, as shown in FIGS. 2-4, repair device 20 is comprised of an approximately 15" long×1.75" wide×0.375" thick metal plate 22. Plate 22 has a top side 26 and a bottom side 28. In this embodiment, plate 22 is made from 6061 aluminum although plate 22 could be made from other metals or rigid materials and fall within the scope of the invention. An approximately 13" long×0.805" wide extended channel 24 lies within and along plate 22 such that it extends substantially the same length as plate 22 (i.e., more than 50% of the length of the plate). The opposite ends of channel 24 are rounded to accommodate carriages 34, and the sides 23 of channel 24 are generally parallel to one another (i.e., less than 5% deviation from parallel). Channel 24 extends through the entire thickness of plate 22 from top side 26 to bottom side 28, forming a void in plate 22.

On the top side of plate 22, there is a recessed top shouldered region 30 surrounding channel 24, which is approximately 1.135" wide along the length of channel 24 (or approximately 0.168" wider than channel 24 all around) and extends approximately 0.15" down into plate 22. Sides 25 of recessed top shouldered region 30 are generally parallel to one another. On the bottom side of plate 22, there is another recessed bottom shouldered region 32 that surrounds channel 24, which is approximately 1.005" wide (or approximately 0.1" wider than channel 24 all around) and extends up 0.11" into plate 22. Sides 27 of recessed bottom shouldered region 32 are generally parallel to one another. Like channel 24, the opposite ends of shouldered regions 30 and 32 are rounded in order to accommodate carriages 34.

Carriage 34 is comprised of two components—carriage flange 36 and carriage nut 38. As shown in FIGS. 5-8, carriage flange 36 is a metal piece that carriage nut 38 screws onto. Flange 36 is comprised of a bottom base 50 with flattened sides 40 and 42, which are generally parallel to one another and only separated by 1.0", and curved sides 39 and 41, which are separated by 1.125". An approximately 0.71" diameter, generally cylindrical threaded portion 44 protrudes approximately 0.17" from bottom base 50. Hollow portion 51 extends through the center of bottom base 50 and threaded portion 44. In this embodiment, threaded portion 44 is threaded with ¾-24 threads on outside region 46 and ⅝-18 threads on inside region 48. Flange 36 is approximately 0.375" high from the bottom of bottom base 50 to the top of threaded portion 44. Flange 36 is made from hardened steel, but it could be made from other rigid materials and fall within the scope of the invention. While this particular embodiment uses a threaded portion 44 with threads on both the inside and outside, other designs could also be used, such as one where the interior was smooth or channeled, and still fall within the scope of the invention.

Figure 9:
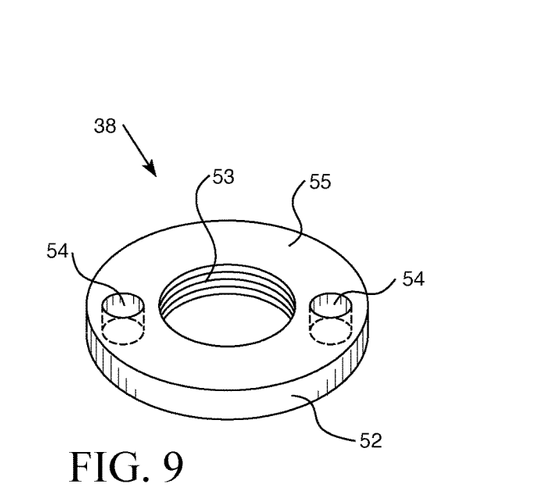
FIG. 9 is a perspective view of the top side of a carriage nut.

As shown in FIG. 9, Carriage nut 38 is an approximately 1.125" diameter×0.196" thick threaded generally cylindrical metal ring 52, which is designed to mate and screw onto the outer threaded portion 44 of carriage flange 36. The interior threaded nut portion 53 of ring 52 is circular, approximately 0.75" in diameter, and threaded with ¾-24 threads. Nut 38 contains two 0.135" diameter holes 54 that pass through the outer metal ring 52. Alternatively, holes 54 could just be in the top surface 55 of ring 52 and not extend through the entire ring 52. Holes 54 are located on opposite sides of ring 52. Alternatively, different numbers of holes 54 (such as three, four, or more) and different positions of holes 54 could be used and fall within the scope of the invention. Nut 38 is made from carbon steel hardened to Rc55, but it could be made from other rigid materials and fall within the scope of the invention.

Again, other shapes, sizes, materials, and threads for carriage flange 36 and carriage nut 38 could be used and fall within the scope of the invention. For example, nut 38 could be a generally hexagonal or square shape, among others.

Figure 11A:
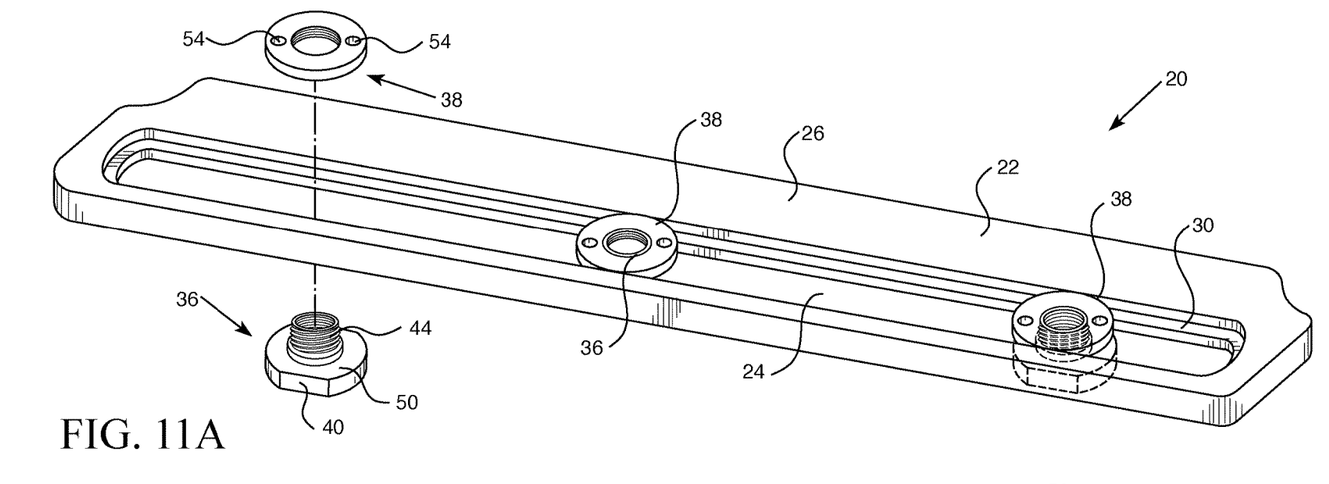
FIGS. 11A and B are views partially-exploded perspective views of a plate and carriages from the top and bottom sides, respectively.
Figure 11B:
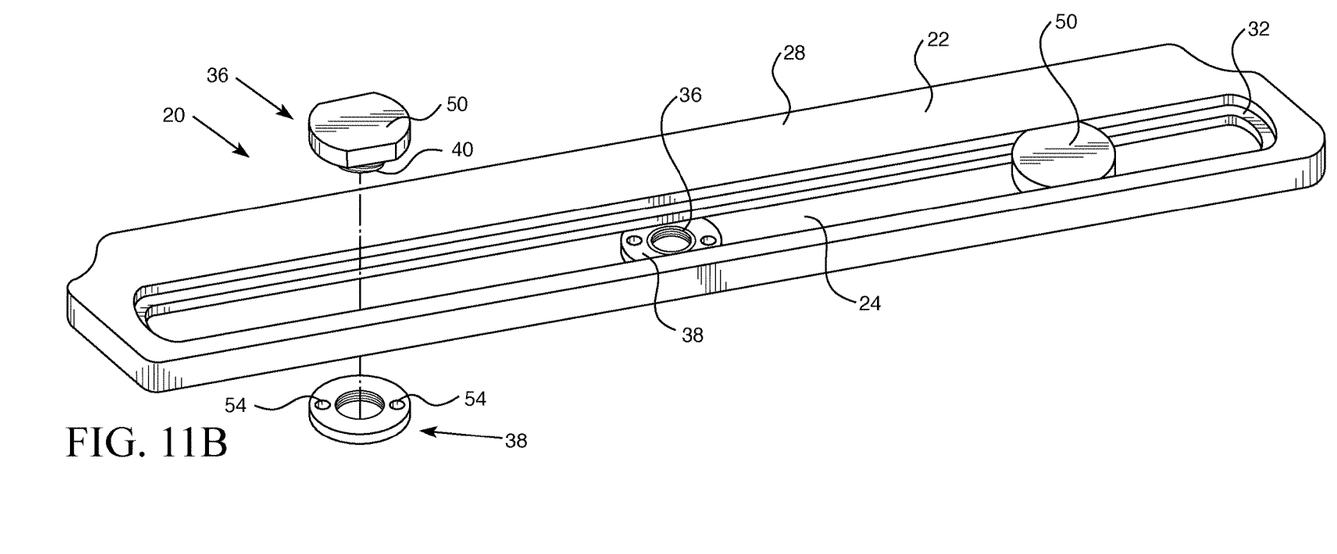

As shown in FIGS. 11A and 11B, when assembled, carriage flange 36 is placed into channel 24 in plate 22 from underside 28. Threaded portion 44 protrudes through channel 24, and flattened sides 40 and 42 align with sides of shouldered region 32. In this way, carriage flange 36 is partially constrained by channel 24 and shouldered region 32, but can slide along channel 24.

Figure 12:
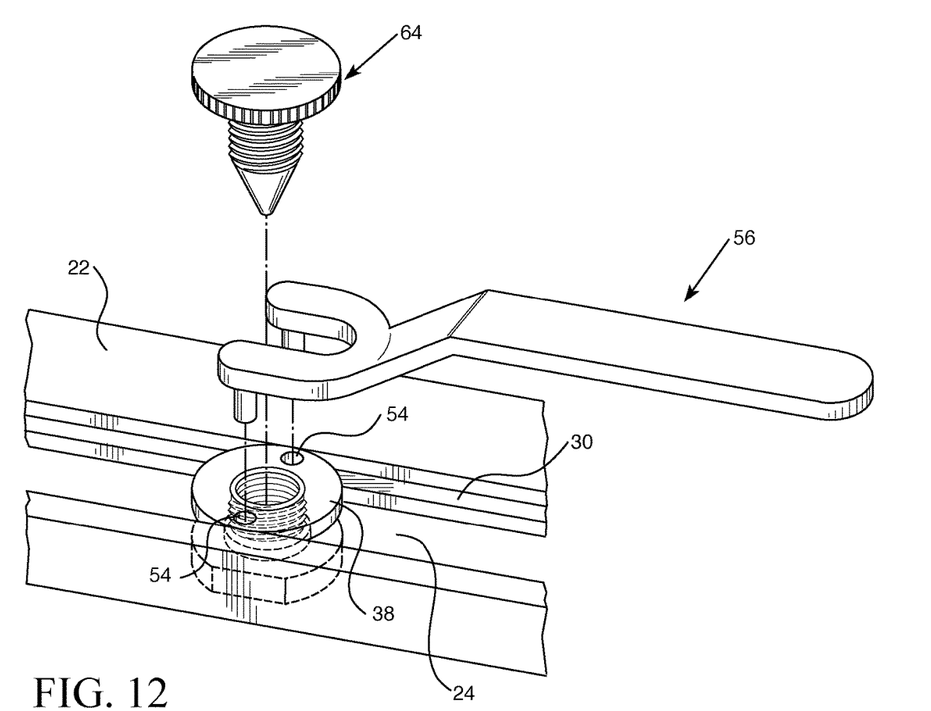
FIG. 12 is a view of a spanner about to engage holes in a carriage nut.

Carriage nut 38 is tightened onto the outer threaded portion 44 in carriage flange 36 from the topside 26 of plate 22. When assembled in this manner carriage flange 36 and carriage nut 38 form carriage 34, and carriage 34 is constrained in channel 24 by virtue of the shouldered regions 30 and 32, such that it can only move along channel 24 when carriage nut 38 is loose. Flattened sides 40 and 42 fit into recessed shoulder region 32 and nut 38 fits into recessed shoulder region 30. As shown in FIG. 12, spanner tool 56 with protrusions can be inserted into holes 54 and rotated, thereby tightening and fixing nut 38 onto flange 36 and effectively locking it into place along channel 24 as desired by the operator. While this embodiment uses holes 54 to facilitate the rotation and tightening of nut 38, other mechanisms could also be used to serve the same purpose, such as a hexagonal or square protrusion on nut 38 to accommodate a standard wrench, for example.

Repair device 20 comes with three carriages 34 (first carriage 58, second carriage 60, and third carriage 62) that can be inserted into channel 24 at various locations and then secured and fixed to repair device 20 via the tightening of carriage nuts 38. Two of the carriages (58 and 60) are used to secure repair device 20 onto engine 10, and one of the carriages (62) is used to guide repair tools. Because the carriages are formed from two threaded pieces, they can be positioned and repositioned along channel 24 wherever the operator desires.

When repairing a broken or blocked exhaust manifold mounting hole 18, repair device 20 must be attached to engine 10 in the proper orientation before repairs can begin. One exemplary method of doing so is described below.

Figure 13:
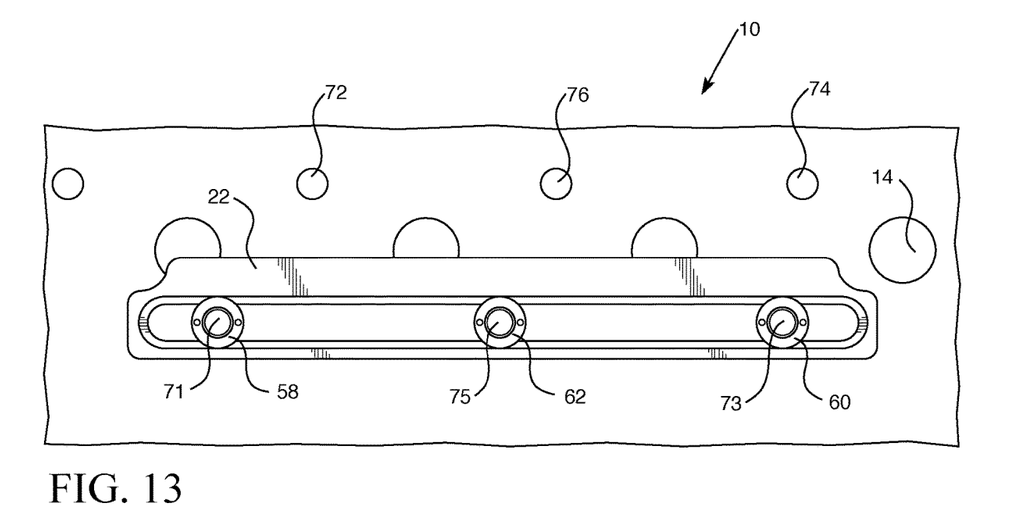
FIG. 13 is a top view of an embodiment of the invention mounted onto an engine.

In one exemplary method of repairing broken mounting hole 76 using the above-described embodiment of repair device 20, exhaust manifold 12 is removed from engine 10 by removing the removable mounting bolts 16. Three carriages 58, 60, and 62 are loosely assembled onto plate 22 by placing the carriage flanges 36 in channel 24 and attaching carriage nuts 38 from the other side to constrain the carriages in channel 24. As shown in FIG. 13, the assembled repair device 20 is placed over three exposed and unobstructed mounting holes 71, 73, and 75 and carriages 58, 60, and 62 are roughly aligned with mounting holes 71, 73, and 75. Three styluses (alignment pieces) 64 are threaded into carriages 58, 60, and 62 to assist with alignment of repair device 20 onto engine 10.

For example, stylus 64 (shown in FIG. 10) can take the form of a generally cylindrical threaded bolt, with an approximately 1.25" diameter knurled top 66, a 1" long threaded center portion 68 (whose threads match the interior threads 48 of carriage flange 36), and a 0.5" long generally conical tip 70. Tip 70 is generally in the shape of a cone, but with a rounded tip, instead of a pointed one, at the end. Generally conical tip 70 could alternatively have a pointed end or one with another shape at the end. Stylus 64 is made from stainless steel, but it can also be made from other rigid materials.

Figure 10:
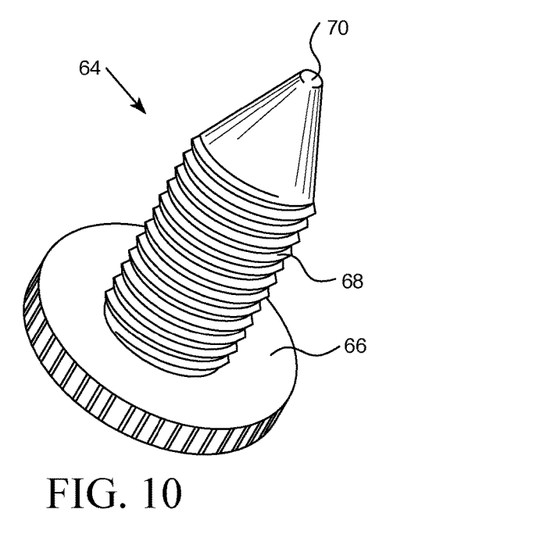
FIG. 10 is a perspective view of a stylus.

As stylus 64 is threaded into the interior threads 48 of a flange 36, tip 70 will pass through flange 36 and emerge from its underside. Because of the generally conical tapered shape of tip 70, stylus 64 and carriage 58 will center themselves in undamaged mounting hole 71. The operator can then tighten carriage flange 38 using tool 56 (such as a spanner) to lock carriage 58 into place. This process is repeated for carriages 60 and 62 and undamaged mounting holes 73 and 75 using additional styluses 64. Because the spacing of the mounting holes in engine 10 is the same for all of the mounting holes, this process very accurately positions carriages 58, 60, and 62 in the correct positions to facilitate the repair of broken mounting hole 76. Once the carriage flanges 38 have been tightened and carriages 58, 60, and 62 are locked into position in channel 24, the styluses 64 may be removed and set aside. While this particular method uses a threaded stylus as an alignment piece, other positioning and alignment pieces could also be used, such as a threaded bolt where there were no interior threads 48, a pin, or an expansion piece, among other things.

Figure 14:
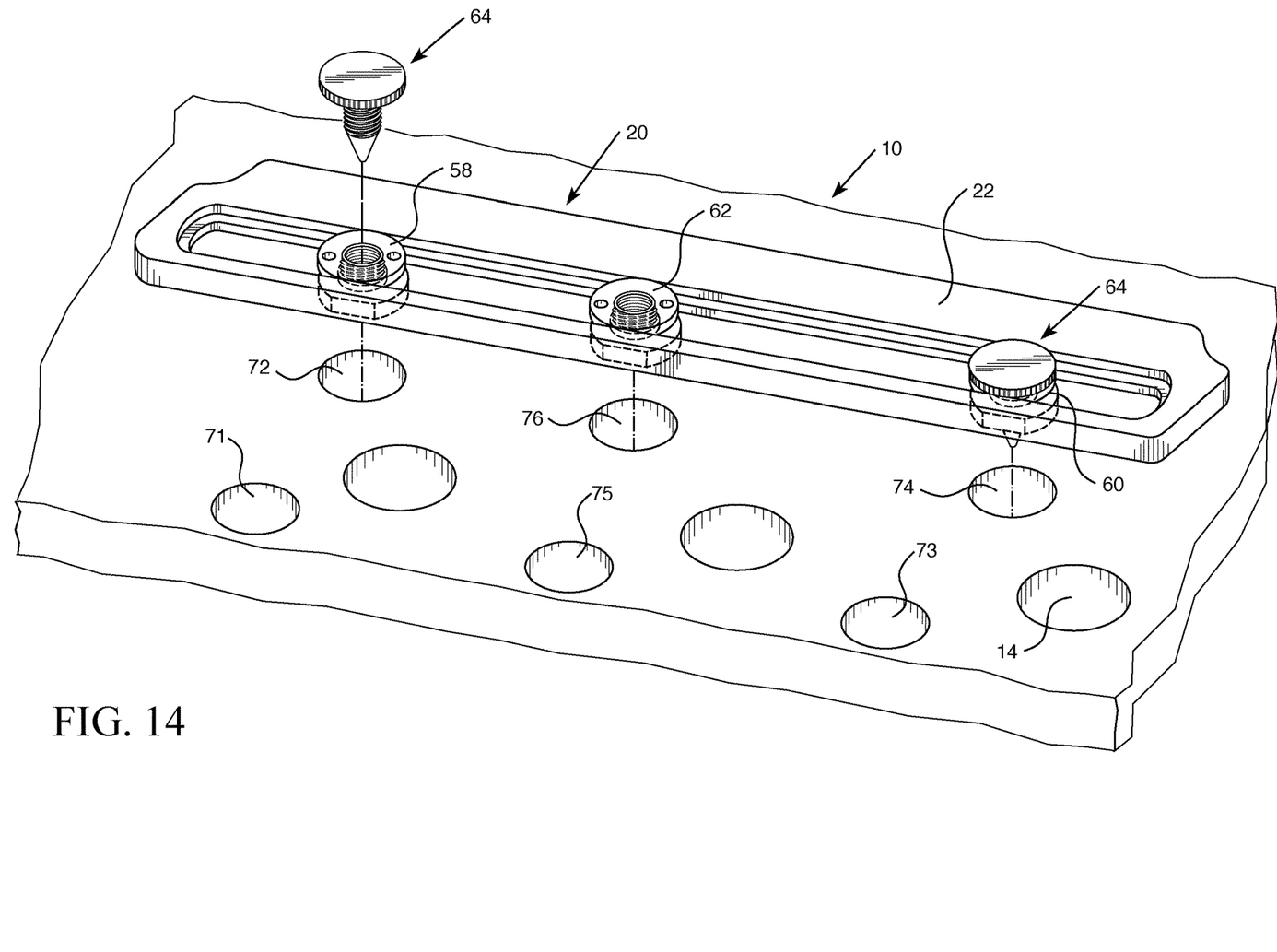
FIG. 14 is an exploded view of an embodiment of the invention to be mounted onto an engine.

Now that carriages 58, 60, and 62 have been used to precisely duplicate the cylinder head bolt pattern and are aligned relative to one another, repair device 20 is lifted off of engine 10 and repositioned such that carriages 58, 60, and 62 are precision aligned over two exposed unbroken mounting holes 72 and 74 and broken mounting hole 76. In the example shown in FIG. 14, broken mounting hole 76 lies between unbroken mounting holes 72 and 74. However, carriage 58, 60, and 62 could be positioned such that the broken mounting hole lies below either carriage 58 or 60 as needed. Mounting pieces such as threaded machined mounting fasteners and drill bushings are then inserted through carriages 58 and 60 and into unbroken mounting holes 72 and 74 in order to securely attach repair device 20 to engine 10. Alternatively, stylus 64 can be configured to act as a mounting piece for the tool or bushing. Because the actual mounting holes on the engine were used to align carriages 58, 60, and 62, carriage 62 will be precisely aligned with broken mounting hole 76.

Figures 15, 16:
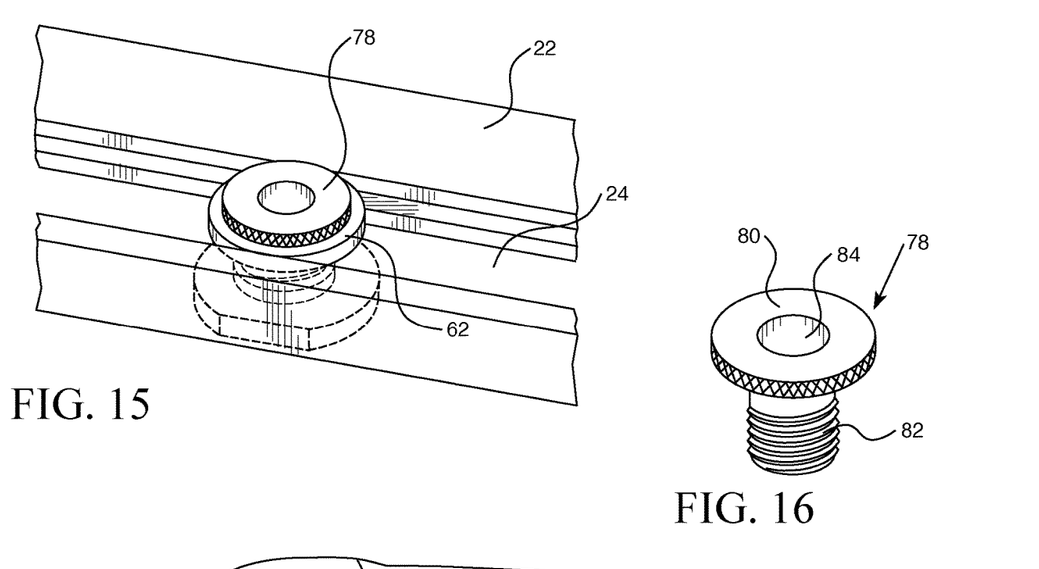
FIG. 15 is a perspective view of a bushing in a carriage.
FIG. 16 is a perspective view of one embodiment of a bushing.

Once repair device 20 has been secured into its proper location, the operator can begin repair of damaged mounting hole 76. The operator drills out the damaged mounting hole 76 in order to remove the broken mounting bolt 16 or any other impediment in hole 76. As shown in FIG. 15, the operator accomplishes this by inserting bushing 78 into carriage 62. In one embodiment, bushing 78 is a generally cylindrical guide for repair tools. As shown in FIG. 16, bushing 78 is comprised of a knurled upper portion 80 and a threaded outer portion 82 (whose threads match the interior threads 48 of flange 34). Bushing 78 has a hollow and smooth interior portion or channel 84, which extends from top to bottom and allows repair tool 86, such as a drill bit or tap, to pass through it. Other forms and shapes of bushing 78 could also be used and fall within the scope of the invention.

Figure 17:
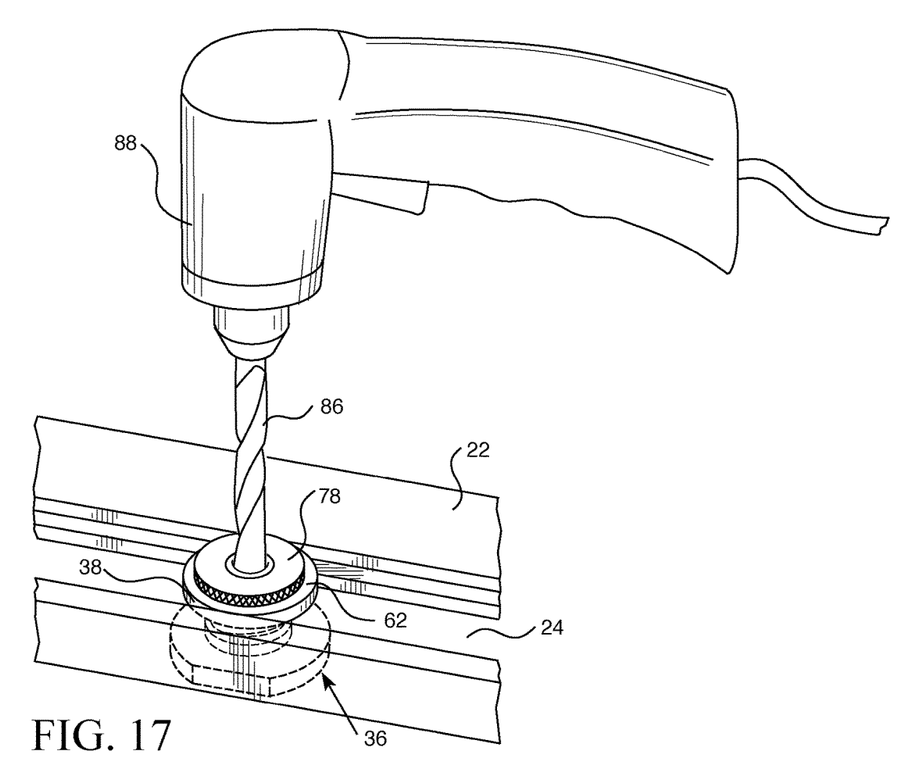
FIG. 17 is a perspective view of a drill passing through a bushing.

Bushing 78 is placed and threaded into carriage 62 until tight. As shown in FIG. 17, the operator then uses drill bit 86 in a drill 88 to drill out the damaged mounting hole 76 by inserting the drill bit through bushing 78 in carriage 62. Various bushings 78 with different diameter hollow interior channels 84 can be used in this process. For instance, a bushing with a 0.124" hole can be used for the first drill out, and then bushings with larger holes (such as 0.188" to 0.320" diameter) can be used until the entire hole has been drilled out to the desired width. Yet another bushing 78 can be placed into carriage 62 that is sized to accept a tap that can be used to either clean out the existing threads in damaged mounting hole 76 or create entirely new threads.

Once damaged mounting hole 76 has been repaired, the operator removes repair device 20 from the engine and re-installs the exhaust manifold using the newly repaired hole and the previously sufficient holes. The carriages in repair device 20 may be left in repair device 20 until the next exhaust manifold needs repaired, in which case the carriages may need to be adjusted depending on the type of engine being repaired, or they may be removed and stored separately with the repair device.

This method allows a mechanic to repair all of the exhaust manifold mounting holes in almost any engine in a precise, flexible, and efficient manner using a single repair device. As one of skill in the art would recognize, these precise steps need not be followed or may followed in a different order and fall within the scope of the invention. For example, styluses 64 could be inserted into carriages 58, 60, and 62 before the any of the carriages were locked down. In addition, the repairs could be made differently depending on the condition of the broken mounting hole (e.g., whether it needed to be drilled out or whether simply re-tapping it would be sufficient).

While the above embodiments of this invention are directed to repairing engine exhaust manifolds, the same principles can be used for repairing other components in an engine where there are multiple bolt holes that are repeatedly spaced such that this template design approach can be used. For instance, this universal template approach could be used to repair mounting holes associated with water pumps, intake manifolds, automatic transmissions, and intake sides of engine cylinder heads, among other things. Because different engine components have different sizes, the dimensions of repair device 20 disclosed above may need to be different (e.g., smaller or larger, longer or shorter, wider or narrower, thinner or thicker, etc.) in order to accommodate the differences in sizes for those other components, but the same principles would apply.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

What is claimed is:

1. An apparatus for repairing engine mounting holes, comprising:
   a plate with a top side and a bottom side;
   an extended channel in the plate that extends through the plate from the top side to the bottom side and is substantially the length of the plate; and
   at least three carriages, said first, second, and third carriages being each comprised of a carriage flange and a carriage nut;
   wherein
   each carriage flange has a bottom base and a threaded portion extending from the bottom base;
   each carriage flange has a hollow portion that extends through the center of both the bottom base and the threaded portion and that forms an inside and an outside region of the threaded portion;
   the threaded portion is threaded on both the inside and outside regions of the threaded portion;
   each carriage nut has an interior threaded nut portion, wherein the interior threaded nut portion is configured to thread onto the outside region of the threaded portion; and
   each carriage is configured to fit inside the channel; and
   three alignment pieces, said first, second, and third alignment pieces being each configured to thread into the inside threaded region of the threaded portion of each carriage flange.

2. The apparatus of claim 1, further comprising a recessed top shoulder in the top side of the plate surrounding the channel.

3. The apparatus of claim 2, further comprising a recessed bottom shoulder in the bottom side of the plate surrounding the channel.

4. The apparatus of claim 3, wherein the bottom base has two curved sides opposite one another and two flattened sides opposite one another that are configured to rest in the recessed bottom shoulder.

5. The apparatus of claim 1, wherein the carriage nuts have a top surface and further comprising at least two holes in the top surface of the carriage nuts adapted to accept a tool for rotating the carriage nuts.

6. The apparatus of claim 1, wherein the carriage nuts are generally cylindrical in shape.

7. The apparatus of claim 1, wherein the first, second, and third alignment pieces are threaded styluses with a threaded center portion and a generally conical tip.

8. The apparatus of claim 1, further comprising a bushing with a hollow interior channel and a threaded outer portion that is adapted to thread into the inside threaded region of the threaded portion of the carriage flange.

9. The apparatus of claim 8, wherein the hollow interior channel of the bushing is configured to accept a repair tool.

10. The apparatus of claim 9, wherein the repair tool is one of a drill bit or a tap.

* * * * *